United States Patent Office 3,547,966
Patented Dec. 15, 1970

3,547,966
PROCESS FOR PRODUCING TRIALKOXY MONOHALO TITANIUM COMPOUNDS
Charles E. Marble, Troy, Mich., assignor to Ethyl Corporation, New York, N.Y., a corporation of Virginia
No Drawing. Continuation-in-part of application Ser. No. 603,141, Dec. 20, 1966. This application Oct. 22, 1969, Ser. No. 868,615
Int. Cl. C07f 7/00, 7/28
U.S. Cl. 260—429.5
8 Claims

ABSTRACT OF THE DISCLOSURE

Trialkoxy monohalo titanium and related compounds are produced from corresponding metal halides and alcohols. With $TiCl_4$ the product is $(RO)_3TiCl$. The reaction is performed preferably with solvent at reflux at preferred temperatures of about 150–165° C. and requires alcohols of about 6 or more carbon atoms per molecule since lower alcohols, particularly methyl, ethyl and propyl, do not react in the same way. The process avoids the use of complexing agents which prior art indicates to be necessary to react beyond a lower level (the dialkoxy dichlorotitanium level for $TiCl_4$). This process is suitably also a first step of a new two step process for producing fully alkoxylated compounds.

CROSS REFERENCE TO RELATED APPLICATIONS

This application is a continuation-in-part of application Ser. No. 603.141, filed Dec. 20, 1966 and now abandoned.

BACKGROUND

This invention relates to the preparation of organometal compounds of the IV–B metals, and in particular such compounds as trialkoxy titanium chloride and tetraalkoxy titanium.

The prior art of the above field of invention is generally based upon reactions such as that of titanium tetrachloride and the like with a corresponding lower alcohol such as butyl alcohol or even higher alcohols at a fairly low temperature with the result that the reaction proceeds to only two steps of substitution, namely the dibutoxytitanium dichloride level, even where by-product HCl is removed as by a stripping agent. The reaction is caused to go to the fourth level of substitution, tetrabutoxytitanium, in the prior art by employing acid acceptors or complexing agents such as ammonia or organic bases, typically amines, to combine with the by-product HCl. The resolution of the resulting complexes and the filtration normally required with such prior art operations provide difficult obstacles to the economical production of such tetraalkoxytitanium compounds adding materially to the cost of production of such materials.

Typical patents in the field include U.S. Pats. 2,187,821; 2,654,770; 2,655,523; 2,663,720; 3,119,852; and 3,268,-556; German Patent 1,035,129 and British Patent 1,040,-892. In the British patent it is specifically indicated that the reaction of titanium tetrachloride and alcohols goes only to the dialkoxytitanium dihalide state and that an acid acceptor is required to cause the reaction to go further. U.S. Pat. 2,663,720 appears to infer in an introductory paragraph that substitution to the monohalide state (third level for titanium compounds) occurs. However, upon further reading it is evident that there is no teaching that a free $Ti(OR)_3Cl$ compound is produced but merely that an intermediate $Ti(OR)_3Cl \cdot 3HCl$ is presumed formed. From the present experience it appears possible that lower alcohols such as ethyl, propyl, and butyl may form such monohalo compounds but if so one cannot remove the last associated HCl molecule except with a complexing agent (acceptor) of some form. Most of the other patents cited teach that when such an acid acceptor or complexing material is used, the reaction proceeds to the tetralkoxy level. In summary then, there is prior art teaching as to how to produce the dialkoxy dihalo and the tetraalkoxy titanium compounds but not the intermediate non-associated form. While it might be possible to control stoichiometry and extent of reaction when using the acid acceptors or complexing materials so as to stop the tetraalkoxy producing reaction at the trialkoxy monohalo level, any such use of additional materials is an undesired complication.

THE INVENTION

The present invention is based upon the discovery that the reaction of metal halides and $C_6+$ alcohols, typically titanium tetrachloride and hexyl alcohol, proceeds in a different manner than that known in the above prior art when it is conducted at higher temperatures than generally used by such prior art and while employing other conditions dissimilar from the prior art. The different course of reaction is enhanced by operation at reflux of an inert organic solvent which is selected conveniently so as to boil at about the desired temperature of reaction at atmospheric pressure so that the reaction can be performed at or near atmospheric pressure with excellent control at reflux of the solvent in a simple vessel equipped with a reflux condenser and off-gas collector or water scrubber, the solvent itself being easily removed after the conclusion of the reaction by non-return of the reflux condensate. In the new reaction, substitution beyond the dialkoxy dihalo level (second) to the trialkoxy monohalo level (third) readily occurs without requiring additional materials of the type described in the prior art as acid acceptors or complexing agents or the like. Furthermore, by control of stoichiometry it is possible to achieve virtually complete utilization of the reactants so that with the easy removal from the system of by-product hydrochloric acid as non-condensables passing through the reflux arrangement, the product is trialkoxy titanium halide of exceedingly high purity directly usable for most purposes without further purification, or filtration, or resolution of complexes, etc.

Thus in accordance with the principles of this invention, a process is provided for preparing organic titanium compounds of the formula $(RO)_3TiCl$ by reacting a compound of the formula $(RO)_{4-n}TiCl_n$ where R is a hydrocarbon group having from about 6 to about 30 carbon atoms such as alkyl, aryl, alkaryl, aralkyl, or cycloalkyl, the various R's being similar or different, and where $n$ is an integer from 2 to 4, both inclusive, with a hydroxyl compound of the formula ROH in the proportions of about one mol of ROH per $(n-1)$ mol of $(RO)_{4-n}TiCl_n$ at a temperature from about 135–235° C. at about atmospheric pressure, in the presence of an inert solvent whose boiling point is about the temperature of operation at the pressure employed.

If desired, the trialkoxytitanium halide produced in the principal new reaction as described above can be transalkylated with other organic radicals so as to produce alkoxy constituents dissimilar from those corresponding to the starting alcohols; however, usually this aspect has more to do with control over ancillary materials in utilization of the products of the present invention than in actual utility of the compounds themselves because for most purposes the trialkoxytitanium halides of hexoxy constituency and higher behave quite similarly in most of their usual utilizations as catalyst materials.

As just noted, the compounds produced by the present invention have utility as catalysts for various reactions;

more specifically they may be used as catalyst ingredients for polymerization of olefinic materials. Thus, they may be used in combination with aluminum alkyls to prepare catalysts for the polymerization of ethylene, propylene or the like pursuant to known technology. In addition, the products producible by the process of this invention may be used either directly or as intermediates for the synthesis of waterproofing agents.

General aspects of the reaction of titanium tetrahalides with alcohols are well known in the field to which the invention pertains as can be seen from the patents cited above. Briefly the present reaction differences are emphasized as higher temperatures than those generally involved in prior art reactions of such materials; the presence of a reflux solvent or diluent having a desired boiling point; at about atmospheric pressure; and preferably with specific stoichiometry corresponding to that of the substitution to the monohalo level. This stoichiometry is exemplified by three mols of alcohol per mol of starting titanium tetrahalide, two mols of alcohol per mol of starting monoalkoxytitanium trihalide, etc. In performing the reaction at reflux of the solvent, by-product hydrogen halide is allowed to pass off as non-condensable gas thus being readily removed from the system. This type of removal of non-condensable hydrogen halide seemingly is quite obvious in a general sense and quite capable of removing the by-product material (HCl) from the reaction zone so as to push the reaction equilibrium to a fully substituted completion if sufficient alcohol is available; however, as noted above, the prior art recognizes that this does not happen. British Pat. 1,040,898 explicitly teaches that the reaction proceeds only to the second level of substitution, typically dialkoxytitanium dichloride even with the removal of HCl as liberated, and that only by the deliberate provision of an acid acceptor or a complexing agent to forcibly remove the by-product hydrogen halide can the reaction be caused to proceed beyond such second level. Unfortunately, complexes or compounds resulting from the addition of these materials introduce very difficult product separation problems. Although these separation problems are usually glossed over in simple terms, even filtration is outstandingly difficult in this instance because of the necessity for pressure operation and the preservation of anhydrous conditions. With the present process it is possible to go beyond the prior limit, namely to trialkoxytitanium monohalide without employing acid acceptors or complexing agents or any complex separation or purification techniques.

In the process of the present invention the halide reactants are those of titanium, it being understood that there are other equivalents, such as zirconium halides that will in general participate in reactions in accordance with the present invention. For simplicity in connection with the following discussion, only those compounds of titanium are discussed, it being understood that the invention in general relates to reactions involving equivalents to titanium, some of which may have valences other than four. The halogen present in the reactants is in general chlorine, bromine or iodine; however, fluorine is not excluded as an equivalent as long as one bears in mind that there is not any particularly great need or justification for the employment of the more exotic and expensive materials which normally are accompanied by higher costs, greater difficulty of handling and lessened availability. Thus, in general, one prefers the chlorine compounds and considers the other halogens as suitable. Since the reaction of the present invention goes through three steps or stages in the conversion from a halide of a Group IV–B metal with a valence of four such as titanium to produce the corresponding trialkoxytitanium halide, it is evident that one is not limited to purely inorganic starting materials but may employ intermediate mono- or dialkoxytitanium tri- or dihalides and convert them to the desired product form. Thus, the present invention envisions that substantially equivalent reactants for the metal halides are the dialkoxy compounds such as dihexoxytitanium diiodide and the alkoxy compounds such as octoxytitanium tribromide. In general, equivalent results are obtained with all of these intermediate forms and it is merely necessary to give due consideration to the stoichiometry involved so as to yield corresponding high purity product monohalo compounds such as tridecoxytitanium chloride and the like.

The choice of the hydroxyl reactants (pure or mixtures) for the process of the present invention likewise involves a considerable range of materials within the general considerations previously noted that the lower alcohols such as ethyl, propyl and butyl do not react to the extent of providing a trialkoxy monohalo product or they go beyond this state due to precipitation as with methyl as shown in U.S. Pat. 3,268,566. The invention is restricted to those alcohols of about hexyl and higher in terms of carbon atoms per molecule. In general, there is no rigid upper limit upon the size of the alcohol molecules that can be employed in the present reaction; however, as a practical matter, particularly considering the physical properties of the materials involved, the preference here is restricted to those alcohols up to about 30 carbon atoms per molecule. The type of alcohols employed in the present invention is not a rigid limitation, suitable alcohols being those classed as straight chain primary, branched chain primary, straight chain secondary, branched chain secondary, tertiary, unsaturated, and the like; pure and in various mixtures; however, again the selection of the particular alcohol to be used within the ranges discussed depends more on the desired configuration of the alkyl constituency of the product materials than upon inherent limitations of reaction of the starting alcohols. The preferred alcohols are the primary and secondary alkanols having from 6 to about 30 carbon atoms in the molecule.

Typical alcohols include normal alcohols such as hexyl, heptyl, octyl, decyl, hendecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, and the like.

Other suitable typical alcohols include branched counterparts of the foregoing such as 2-methyl pentanol, 2-ethyl butanol, 2-ethyl hexanol, 4-methyl hexanol, 2,2-dimethyl butanol, 2,4-dimethyl pentanol, 2,4-dimethyl hexanol, 3-methyl octanol, 3-ethyl heptanol, 4-methyl heptanol, 3-ethyl hexanol, 2-ethyl eicosanol, 18-ethyl eicosanol and the like.

Other typical alcohols include secondary alcohols, such as hexanol-2, hexanol-3, octanol-2, decanol-2, decanol-3, decanol-4, decanol-5, nonanol-5, dodecanol-2, dodecanol-6, tetradecanol-2, tetradecanol-6, eicosanol-2, eicosanol-10, contanol-2 and the like.

Other typical alcohols include branched secondary alcohols, such as 5-methyl-heptanol-3, 5-methyl-hexanol-3, 2-methyl-octanol-3 and the like, particularly those based on combination of the foregoing branching of branched alcohols typified and OH positioning of the secondary alcohols typified. In further elaboration of the foregoing, it is also contemplated that not only are the alcohols used pure in the sence of using individual alcohols from the above categories but also that the alcohols employed can be mixtures within each of the foregoing categories as well as mixtures where two or more of the foregoing categories are involved. Thus, typical alcohols include mixtures of normal and branched alcohols as are typically produced in the oxo process or by the hydration of random olefins in which case such mixtures can be diverse not only as to position and degree of branching if any, but also as to molecular weight. In addition to the foregoing, other typical alcohols include those derived from natural sources and from various fractionations, blends, and blends of fractionated components from such alcohols, such natural source alcohols being typified as coconut alcohols, center cut coconut alcohols predominating in those normal alcohols having 12, 14 and 16 carbon atoms per molecule components such as 65 percent dodecyl alcohol, 25 percent tetradecyl alcohol, and 10 percent hexadecyl alcohol; tallow alcohols, hexadecyl alcohol, octadecyl alcohol, stearyl alcohol and the usual unsaturated tallow alcohol accessories such as linoleyl alcohol and linolenyl alcohol. Included are the usual commercial mixtures of the above alcohols as well as fractions thereof and blends. Thus the R components in individual molecules in trialkoxytitanium halide product can be similar or different and different molecules in product mixtures can have a variety of R components. In general, the distribution in such instances is statistical.

Tertiary alcohols such as 1,1-dimethylhexanol and 1,1,3,3-tetramethylbutanol may also be used.

By proper choice of alcohol within the framework of the foregoing general considerations, it is evident that it is possible to produce through the process of the present invention trialkoxytitanium halides and equivalents of wide variety within the general limitation that the R groups must have about 6 carbon atoms or more ranging up to about 30 carbon atoms per R group.

The stoichiometry of reactants is important to bring the reaction to the desired level and minimize product purification requirements. In essence, it is desired to have adequate alcohol present to convert the metal halide material to the desired monohalide level (third for Group IV-B materials with valence of 4). An excess of alcohol is preferably avoided because it does not constitute a requirement for reasonable speed of reaction or completeness thereof, while it does impose an adverse requirement for removal since excess alcohol normally is an undesired contaminant of the desired third level product. Thus one normally employs alcohol in the proportion of 1 molecule per molecule of metal halide material per level of substitution desired. For titanium tetrachloride, this involves three molecules of alcohol per molecule of metal halide material whereas for alkoxytitanium trihalide the requirement is for two molecules of alcohol per molecule of metal halide material and for dialkoxytitanium dihalide the requirement is one molecule of alcohol per molecule of metal halide material. Similar relationships prevail where one seeks to go to the monohalide condition with compounds of metals having a valence other than four.

The solvents (or diluents) preferably used in connection with the foregoing are inert organic solvents, preferably saturated or aromatic hydrocarbons, typically cyclohexane, heptane, octane, nonane, decane, benzene, toluene, alkyl benzenes and toluenes, halohydrocarbons and various mixtures of these materials and of similar materials, there being many such commercially available under various trade names such as Solvesso. In general, the selection of a solvent is influenced greatly and even limited by the temperature of operation desired because of the preferred method of operation at reflux of the solvent at atmospheric pressure. The broad range of suitable temperature is from about 135–235° C., more preferably from about 150° C. to about 165° C., typically about 155° C. Ths range is determined by a need to operate at about 135° C. or above as an element of causing the reaction to proceed to the monohalo level (third for IV-B materials) and by a need to avoid operation much above 235° C. where degradation of materials through undesired side reactions becomes more pronounced.

Normal paraffins ranging from octane through about dodecane are highly preferred solvents, nonane particularly because of boiling point considerations. One desideratum with regard to solvent is that unsaturation be avoided in straight chain structures or straight chain portions of compounds containing ring structures unless specifically desired because olefin solvents appear to have a suppressive effect upon the reaction possibly due to combination thereof with liberated HCl. This does not exclude the benzene and cyclic saturated hydrocarbons or derivatives thereof such as the various alkyl benzene compounds, the alkyl cyclohexane compounds, typically toluene noted above, butyl toluene, ethyl toluene, isopropyl toluene, normal propyl toluene and similar alkyl cyclohexane compounds. Other suitable solvents, provided they are inert in the reaction system, include chlorinated hydrocarbons such as carbon tetrachloride and the like.

In the recitation of the foregoing typical solvents, it is evident that several are listed having boiling points which are not within the preferred temperature range of operation at atmospheric pressure; however, these materials are not excluded as solvents because the various other materials present in the reaction mixtures will to some extent alter the actual boiling points and, as will be seen in the ensuing discussion of pressure of operation, pressures somewhat greater than atmospheric are suitable for the present invention in which case these solvents can be used to advantage within the preferred temperature range for the present invention.

The pressure of operation is a variable which is important in providing the best mode of operation of the present invention but which is not highly critical in the sense that it has any profound influence upon the course of reaction or the results obtained. In general, it can be stated that pressures can be controlled to advantage in consideration of the boiling points of the reactants, products and solvents included within the foregoing structure of invention, but that in general the choice of solvent, temperature and pressure are coordinated to secure about atmospheric pressure operation at reflux of the solvent at a desired temperature of operation. In general, pressures significantly above atmospheric, say 5 or 10 atmospheres, do not provide any material improvement in result over what is readily attainable at atmospheric and appear to retard the removal of by-product hydrochloric acid and for that reason as well as avoiding pressure vessels are undesired. Likewise, pressures significantly below atmospheric, say $\frac{1}{10}$ to $\frac{1}{4}$ atmospheric, are undesired for various reasons including volatility considerations of reactants and products as well as because they increase the volume of hydrochloric acid that must be handled. Thus, the preference is for about atmospheric pressure operation since this provides a decided advantage in the avoidance of pressure vessels and minimizing the results of leakage either inwardly or outwardly, the overall result being a peculiar degree of coordination of solvent, temperature, and pressure which provides a best mode illustration for the present invention.

The reaction time is mainly a dependent variable in the sense that within the general considerations expressed for the other conditions in the foregoing discussions, the time normally is controlled so as to secure substantially complete reaction to the level of substitution desired. In general, within the substance of the foregoing, the time of reaction ranges from about ½ to about 4 hours and as is expected in such situations, the rate of reaction tapers off as time progresses. In general, the longer reaction times within the range specified above are preferred where high purity monohalo product is desired without the involvement of purification steps other than the vaporization off of the reaction solvent. Thus, in general, reaction times in the order of 2–4 hours are reasonable and most preferred; however, it is of course understood that shorter reaction times such as ½–2 hours are also practical and even can be desired in those instances where it is preferred to trade reaction rate for the additional complication of purification or where purity of product is of comparatively minor importance or where one uses this as a first step of a more complex process to be described subsequently. Since the principal impurity to be considered in most instances is unreacted alcohol, one will normally find that operation at the shorter times, say one hour or less, will generally be accompanied by stoichiometry with alcohol excess above the preferred one molecule of alcohol per molecule of metal halide material per level of substitution which will tend to increase the reaction rate.

Again within the framework of the foregoing considerations as to coordination of conditions, the details of recovery of the desired product of the present invention can range upward from extreme simplicity involving on the one hand merely the adjustment of temperature in the reflux condenser system to allow the solvent to pass overhead at the conclusion of a complete reaction based on 1:1 stoichiometry. Depending upon boiling points, excess or unreacted alcohols if present are usually removable either with the solvent or in a second vaporization step particularly in those instances wherein the unreacted alcohol boils above the solvent but significantly lower than the desired product. Other separation or recovery techniques include decanting in those instances where separate phases are formed as well as extraction with various solvents; however, as the reaction is preferably conducted there is no need whatever for difficult or complex separation steps and operations since by the control of stoichiometry and reaction times, a virtual completeness of reaction is easily obtained in most instances in reasonable reaction times.

Although the foregoing process can be used to provide a desirable product directly, it can be used as a part of a more complex process to yield in new excellence the fully substituted materials such as fourth level tetraalkoxytitanium. For such variation, the present process is the first step, a second step being a reaction of the trialkoxytitanium halide with an additional molecule of alcohol, in the presence of a conventional prior art complexing agent such as sodium, ammonia, amines and generally under the same conditions as those employed in the prior art with such complexing agents when reacting the inorganic metal halides to alkoxy metal compounds. This combined process does not completely avoid the problems of filtration and resolution of complexes, etc. that have previously been expounded upon as disadvantages of such prior art as far as the second step per se of the more complex process is concerned; however, what is achieved overall is a reduction in the magnitude of the problems since by removing all but one halogen in accordance with the present invention, only the one atom of halogen per molecule of starting titanium tetrachloride must be complexed rather than all four as is the case when the prior art complexing reaction is used alone. In many respects this significantly improves the recovery situation with regard to the production of trialkoxytitanium compounds so that this in itself is a new process for producing such tetraalkoxytitanium compounds and their equivalents as defined in the foregoing.

EXAMPLE I

Trioctoxytitanium chloride was prepared by mixing 200 ml. of hendecane solvent and 57.7 ml. of titanium tetrachloride (0.525 mols) in a one-liter creased flask under a nitrogen protective atmosphere. The flask was equipped with a reflux condenser to return evaporated solvent followed by a scrubber to collect liberated HCl from the non-condensables passing through the reflux condenser. This mixture was heated to approximately 100° C., with agitation and 252 ml. of octanol was added to it over a one hour period while maintaining the 100° C. temperature in the flask. This amount of octanol corresponds to a 1:1 mol ratio of alcohol to titanium tetrachloride per level of substitution (three levels). The mixture was then heated to reflux at approximately 195° C. and maintained at that temperature with agitation for 2½ hours. Scrubber water was analyzed for acid content and contained an equivalent of 73.8 percent of the hydrochloric acid evolution corresponding to complete substitution of halogen from the titanium tetrachloride. A portion of the reaction mass was analyzed for titanium and halogen content. The reaction mass weighed 391.4 grams and had a titanium content of 5.91 percent and a chlorine content of 5.02 percent. These data correspond to a recovery of 92.13 percent of the starting titanium and to a chloride content in the reaction mass of 26.2 percent of the starting titanium tetrachloride. This corresponds to a product consisting essentially of trioctoxytitanium chloride and shows an excellent material balance on chlorine.

EXAMPLE II

A 365 gram portion of the reaction mass of Example I was then brought to 60° C. and 85 ml. of octanol added to it following which the mixture was reacted with anhydrous ammonia which was bubbled in for 30 minutes. An excess of ammonia was used over that corresponding to complete conversion of chlorine content of the reaction mass to ammonium chloride in the reaction of $(RO)_3TiCl$ with the additional octanol which octanol was a small excess over stoichiometric for a one level conversion to $(RO)_4Ti$.

The resulting material was then filtered, the cake washed with hexane solvent, dried in a nitrogen atmosphere and weighed. The weight was 24.1 grams ($NH_4Cl$) indicating 0.45 mols of chlorine. The filtrate weighed 440 grams and analyzed 4.9 percent titanium equivalent to 0.45 mols of $(RO)_4Ti$. The mols of Ti in the filtrate matched the mols of chlorine in the cake showing that during the ammonia addition the reaction was carried forward one level, viz from $(RO)_3TiCl$ to $(RO)_4Ti$.

EXAMPLE III

Example I was repeated with a mixture of hexanol, octanol and decanol approximately in equal proportions yielding essentially the same result as to product composition in terms of ratio of alkoxy groups, halogen and titanium and hydrochloric acid evolution during the course of the reaction.

EXAMPLE IV

Example I was repeated with 400 ml. of hendecane and 44 ml. (0.4 mol) of titanium tetrachloride to which was added over a two-hour period 220 ml. of hexanol, the reactor being maintained at 50° C. and agitated during the period of addition. Following the addition, the temperature of the flask was raised to reflux of the solvent and maintained in that condition for three hours. HCl content of the scrubber solution following the condenser showed that 72.64 percent of the halogen content of the titanium tetrachloride was removed. The flask contents weighed 497.5 grams analyzing 3.6 percent by weight titanium and 2.61 percent by weight of chlorine. These correspond respectively to a recovery of 93.6 percent of the starting titanium and a content of the reaction mass of 23 percent of the starting halogen. Again the product corresponds to approximately trihexoxytitanium chloride. In this example one notes that the amount of hexanol charged was an excess relative to the mols per mol of titanium tetrachloride for three levels of substitution.

EXAMPLE V

Example I was repeated charging 200 ml. of a commercial solvent which was a mixture of saturated hydrocarbons averaging about hendecane and 58.6 ml. (0.534 mols) of titanium tetrachloride. To this was added over a period of thirty minutes, at a temperature of 100° C., 200 ml. of hexanol corresponding to 80 percent of the amount required for complete substitution of all halogen in the starting titanium tetrachloride. The reaction mass was allowed to reflux for four hours during which time the HCl collected in the scrubber amounted to 74.4 percent of that corresponding to complete conversion of all starting halogen to HCl. The reactor contents weighed 366.1 grams analyzing 6.95 weight percent of titanium and 5.1 weight percent of chlorine. This was a titanium recovery of of 99.5 percent of the starting titanium and a product mol ratio corresponding to trihexoxytitanium chloride.

EXAMPLE VI

Example I was repeated using 400 ml. of hendecane and 43 grams of titanium tetrachloride (0.224 mols) added to the flask. To this was added 175 ml. of octanol over a 30 minute period, the flask being maintained at 100° C. with agitation. The above amount of octanol corresponds to approximately 25 percent excess of alcohol based upon the amount necessary for complete substitution of all halogen present in the starting titanium tetrachloride. The flask was then heated to reflux of the solvent at approximately 195° C. for 30 minutes. HCl evolved was collected in the scrubber following the solvent reflux condenser and upon analysis indicated a content of 76.8 percent of the theoretical HCl corresponding to complete substitution of all halogen of the starting tetrachloride. The reactor contents were treated with ammonia as in Example II yielding 13.2 grams of ammonium chloride equal to 0.23 mols or 26 percent of the halogen content of the starting titanium tetrachloride reactant. The clear filtrate obtained after separation of the ammonium chloride contained only 0.006 percent halogen and the titanium analysis showed 2.0 percent titanium corresponding to tetraoctoxytitanium. The weight of the filtrate was 540 grams indicating a total overall titanium recovery of about 100 percent relative to the starting titanium content. Product composition prior to the addition of ammonia was thus approximately trioctoxytitanium chloride.

EXAMPLE VII

Example I was repeated using 200 ml. of hendecane solvent which was heated to 90° C. agitated, and 225 ml. of octanol and 68 grams of titanium tetrachloride added simultaneously over a two hour period. The amount of octanol used corresponds to 100 percent of that required to substitute all halogen present in the starting titanium tetrachloride. The starting titanium tetrachloride was 0.358 mols. After completion of the addition, the reactants were heated to reflux at approximately 195° C. and maintained at that point with agitation for a 2½ hour period. HCl collected in the scrubber corresponded to 77 percent of the halogen content of the starting titanium tetrachloride. The reactor contents weighed 357 grams which analyzed 5.08 percent titanium and 3.95 percent chlorine. This indicates a recovery of about 100 percent (actually 106 percent) of the starting titanium and 27.7 percent of the starting halogen. Analytical results indicating such recoveries are not unusual where excess alcohol is used. The product composition was essentially trioctoxytitanium chloride.

EXAMPLE VIII

Example I was repeated using 200 ml. of nonane and 39.3 ml. of titanium tetrachloride. The flask was heated to 100° C. and 225 ml. of octanol added over a thirty minute period. This amount of octanol corresponds to approximately 25 percent excess over that required for complete substitution of all halogen on the starting titanium tetrachloride. The flask was then heated to reflux at approximately 155° C. for four hours, during which time hydrochloric acid evolved was collected in the scrubber following the reflux condenser and amounted to 74.8 percent of that corresponding to complete substitution of all halogen in the starting titanium tetrachloride. The reactor contents were analyzed as in Example I, the reactor contents weighing 349 grams analyzing 5.0 percent titanium and 3.78 percent chlorine. These corresponded respectively to 0.364 mols and 0.372 mols indicating recovery of about 100 percent of the starting titanium and 26 percent of the starting chlorine. This corresponds to a product composition of trioctoxytitanium chloride.

EXAMPLE IX

Example I was repeated to exemplify prior art using 400 ml. of octane solvent and 95 grams (0.5 mols) of TiCl$_4$. The flask was heated to reflux (82° C.) and 165 ml. of isopropyl alcohol added. This alcohol corresponds to 10 percent excess over that required for complete substitution of all halogen in the starting TiCl$_4$. The reflux was continued for 6 hours. HCl collected in the scrubber amounted to 31 percent of that corresponding to total substitution of all halogen in feed TiCl$_4$.

The reactor contents were cooled to 70° and anhydrous ammonia bubbled through for 45 minutes, a slight excess being used over that corresponding to the estimated amount needed for complete substitution of all residual halogen. The NH$_4$Cl produced was filtered out, dried and weighed as in Example II. The cake weighed 73 grams containing 68.2 percent of the starting halogen.

The filtrate weighed 578.2 grams and analyzed 3.75 percent titanium, negligible chlorine, indicating 90.7 percent accountablity on titanium.

This experiment was repeated numerous times with the same results.

From this example one can draw several important conclusions. The first of these is that the reaction goes very poorly with isopropyl alcohol since it does not even approach the 50 percent substitution level corresponding to the composition diisopropoxytitanium dichloride. With low accountability on titanium, it is believed that some was lost overhead during the extended period of operation. It appears that the effective limit for the prior art reaction with isopropyl alcohol is (RO)TiCl$_3$ which is a 25 percent substitution. Thus the difference between 31 percent halogen overhead and 25 percent represents a titanium-halogen compound carried overhead, the difference between 68.2 and 75 percent in cake analysis also supporting this idea as well as the 90.7 percent titanium accountability.

Examples I and II are repeated for other metal halides and alcohols set forth in the foregoing portion of the specification using the various ranges of conditions described therein. Equivalent results are obtained.

I claim:

1. A process for producing organic-titanium compounds of the formula (RO)$_3$TiCl, R as defined herein, consisting essentially of reacting a compound of the formula $$(RO)_{4-n}TiCl_n$$

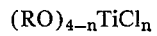

where
R is alkyl, aryl, alkaryl, aralkyl, or cycloalkyl, various R's similar or different, the carbon atom of R bonded to 0 being primary or secondary, R having from about 6 to about 30 carbon atoms,
O is oxygen,
$n$ is an integer from 2 to 4, both inclusive,
with a hydroxyl compound of the formula ROH, where R is as defined above in the proportions of about one mole of ROH per ($n-1$) mole of (RO)$_{4-n}$TiCl$_n$ at a temperature from about 135–235° C. at about atmospheric pressure, in the presence of an inert solvent whose boiling point is about the temperature of operation at the pressure employed.

2. The process of claim 1 with the additional step of removing by-product HCl as a vapor.

3. The process of claim 1 wherein R is normal alkyl having from about 6 to about 12 carbon atoms.

4. The process of claim 1 performed at reflux in the presence of an inert reflux solvent whose boiling point is at about the temperature of operation at the pressure employed, said solvent being selected from the group consisting of saturated hydrocarbons, aromatic hydrocarbons and halo hydrocarbons.

5. The process of claim 1 wherein the temperature is from about 150° C. to about 165° C.

6. The process of claim 1 wherein the temperature is about 155° C.

7. The process of claim 1 wherein the compound of the formula (RO)$_{4-n}$TiCl$_n$ is titanium tetrachloride.

8. The process of claim 1 wherein the hydroxyl compound is straight chain primary alcohol and the compound $(RO)_{4-n}TiCl_n$ is titanium tetrachloride.

References Cited

UNITED STATES PATENTS 3,119,852  1/1964  Gilsdorf _____ 260—429.5
3,418,348  12/1968 Shepard et al. _____ 260—429.5

TOBIAS E. LEVOW, Primary Examiner
H. M. S. SNEED, Assistant Examiner

U.S. Cl. X.R.

260—429.3